C. E. MOORE.
MEASURING AND DISPENSING DEVICE.
APPLICATION FILED OCT. 30, 1918.

1,299,001.

Patented Apr. 1, 1919.

Inventor
Clifton E. Moore

By Herbert E. Smith
Attorney

UNITED STATES PATENT OFFICE.

CLIFTON E. MOORE, OF SPOKANE, WASHINGTON.

MEASURING AND DISPENSING DEVICE.

1,299,001.

Specification of Letters Patent. Patented Apr. 1, 1919.

Application filed October 30, 1918. Serial No. 260,334.

*To all whom it may concern:*

Be it known that I, CLIFTON E. MOORE, a citizen of the United States, residing at Spokane, in the county of Spokane and State of Washington, have invented certain new and useful Improvements in Measuring and Dispensing Devices, of which the following is a specification.

The present invention relates to measuring and dispensing devices portable on the end of a supply hose and capable of being directed to supply the tank or oil reservoirs of an auto to supply a predetermined quantity of liquid.

It is a feature of my invention to use the pressure of an oil pump or reservoir to operate the device of my construction to effect the ends in mind, and this invention consists in providing a horizontal cylinder or fluid tank with a movable piston therein, pipes communicating into either end of the piston and joining with the supply pipe, a fluid pump or reservoir, and a means consisting of a delivery type connecting with the cylinder to provide a predetermined exact amount of fluid.

I have in mind the use of my device principally in supplying oils for engine use, or for supplying gas or other liquids in exact amounts.

In the accompanying drawing.

Figure 1:
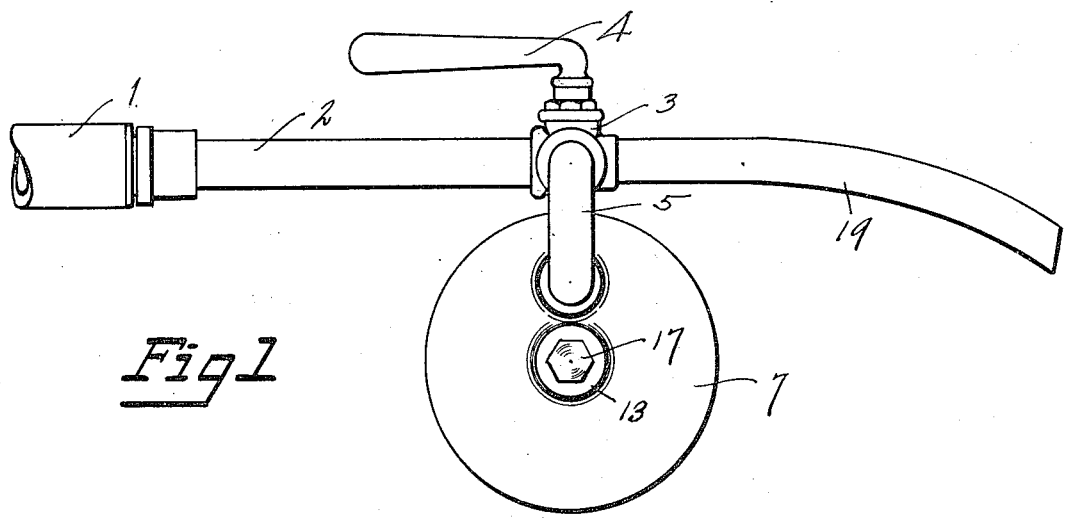
Figure 1 is a side elevation of my apparatus shown in connection with a fragment of a supply hose or pipe.
Figure 2:
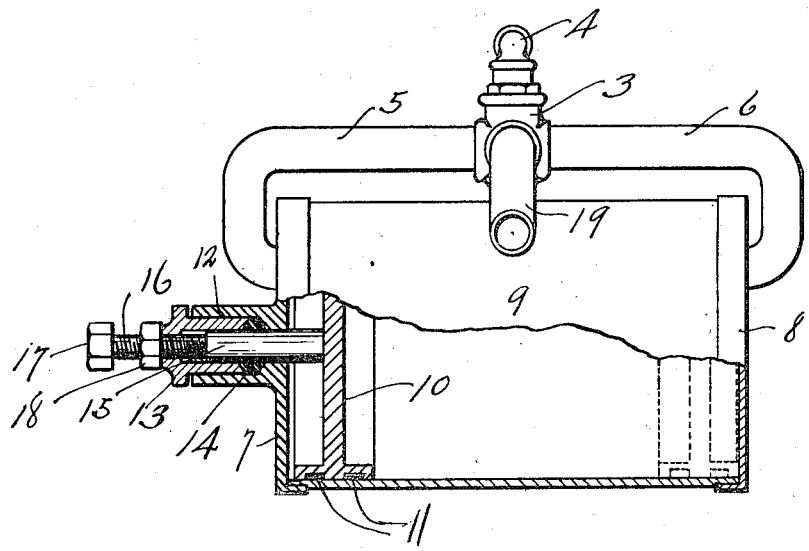
Fig. 2 is an end elevation illustrating partly in section the movable piston within the cylinder and a means for adjusting and limiting the movement of said piston.

In the embodiment of the invention as illustrated in the drawing, the numeral 1 indicates a supply hose of the common type which is usually attached to gasolene and oil pumps. 2 is a short length of pipe connecting the hose 1 and carrying liquid to a two-way valve member 3 provided with a suitable handle 4 for directing the flow in a manner that will be brought out. Leading from the two-way valve member 3 are branch pipes 5 and 6 connecting into the ends 7 and 8 of the cylinder 9. Within the cylinder and movable from end to end is a piston 10 closely engaging the walls and provided with packing members or gasket members 11 to effect a tight joint and prevent a flow of liquid from one side to the other. Upon the cylinder end 7 is an outstanding packing member 12 and gland 13 disposed to hold and place pressure upon the packing 14 to make a perfectly tight joint with the adjusting stem 15. This stem which is movable within the gland is provided with a threaded outer end 16 terminating in a nut or head 17. A lock nut 18 may be used to hold the parts against movement when an adjustment has been effected.

In operation the device will receive a supply of fluid from the source and by manipulation of the valve handle 4 the fluid may be directed into one end of the cylinder or the other, as may be desired. When the valve is so disposed the opposite branch pipe will have open communication through the valve with the delivery pipe 19, thus as fluid is forced into the cylinder the force will move the piston forward and cause the liquid contained within the cylinder to be forced out through the delivery pipe. When the cylinder is filled and the piston moved by the fluid to the farther end, a reverse movement of the valve handle will cause the piston to be reversed pushing ahead of it the supply of liquid contained therein. This liquid will pass up through one of the branch pipes, through a bypass in the valve member and out the delivery pipe 19. A reversal of the handle will drive the contents in the cylinder, forth in the same manner and place a fresh supply on the other side.

If the cylinder be registered inaccurately or a limited supply is desired, by movement of the stem 15 the movement of the piston may be limited to provide the exact amount of fluid desired.

I have designed the present construction specially for use in supplying automobiles with cylinder oil or gas and find that the device works equally well in filling cans or bottles with any liquid contents in the exact quantities desired.

A feature of my invention which is of importance, is that the cylinder is disposed in a horizontal position and the action of gravity can not effect or cause an improper supply of fluid as would be the case were the cylinder disposed in a vertical position, and I find also that in addition to securing an accurate delivery that the same power or force from a pump will operate on either side of the cylinder exactly the same.

I claim:—

1. The combination with a fluid pump and its supply hose, of a dispensing medium consisting of a horizontal cylinder, a movable piston therein, an adjustable stem supported in one of the heads of the cylinder movable longitudinally thereof and engaging with the piston to limit movement of said piston, a screw engaging the stem and adjusting it in the desired position, a two-way valve member connected to the source of supply and to branch pipes entering opposite ends of the cylinder and directing the flow of the liquid alternately through said branch pipes, a delivery pipe joining with the valve member and an open passageway therefrom through one of the branch pipes when the other branch pipe is receiving the flow of liquid from the pump.

2. The combination with a fluid pump and its supply hose, of a dispensing medium consisting of a horizontal cylinder, a movable piston therein, supply branches leading into each end of the cylinder, a two-way valve member connecting with the source of supply and directing the fluid alternately through the supply branches, a delivery pipe alternately connecting through the valve and branches to the cylinder, an adjustable means supported on and extending through one end of the cylinder and movable longitudinally thereof to engage the piston, a fluid-tight packing around said adjustable means, to limit the movement of said piston, and means whereby the adjustment may be effected from outside area of the packing and maintained in a fixed position.

In testimony whereof I affix my signature.

CLIFTON E. MOORE.